United States Patent [19]

Kawamata et al.

[11] 4,193,971
[45] Mar. 18, 1980

[54] PROCESS FOR REMOVAL OF SULFUR OXIDES FROM WASTE GASES

[75] Inventors: Naoyuki Kawamata, Kobe; Tadahara Itoh, Ashiya; Noriaki Takahashi, Kobe, all of Japan

[73] Assignee: Kawasaki Jukogyo Kabushiki Kaisha, Kobe, Japan

[21] Appl. No.: 850,623

[22] Filed: Nov. 8, 1977

[30] Foreign Application Priority Data

Mar. 23, 1977 [JP] Japan .................................. 52-32605

[51] Int. Cl.$^2$ ...................... C01B 17/00; C01F 1/00; C01F 11/46
[52] U.S. Cl. .................................... 423/242; 423/166
[58] Field of Search .................... 423/242, 166, 164

[56] References Cited

U.S. PATENT DOCUMENTS

| | | | |
|---|---|---|---|
| 3,617,212 | 11/1971 | Shal | 423/242 |
| 3,972,980 | 8/1976 | Lowell | 423/242 |
| 3,980,756 | 9/1976 | Dixson et al. | 423/242 |
| 4,046,856 | 9/1977 | Itoo et al. | 423/242 X |

FOREIGN PATENT DOCUMENTS 4522802  8/1970  Japan .
5143999  11/1976  Japan ...................................... 423/242
708095  4/1954  United Kingdom ...................... 423/242

*Primary Examiner*—O. R. Vertiz
*Assistant Examiner*—Gregory A. Heller
*Attorney, Agent, or Firm*—Haseltine, Lake & Waters

[57] ABSTRACT

Sulfur oxides are removed from a waste gas containing $SO_2$ by: scrubbing the gas with an aqueous slurry containing $Mg(OH)_2$ as well as gypsum thereby to transform the $SO_2$ into $MgSO_3$ and to fix the same in this slurry; oxidizing the $MgSO_3$ in this slurry to convert the same into $MgSO_4$; filtering the slurry containing an aqueous solution of the $MgSO_4$ thus formed and gypsum thereby to recover the gypsum; and adding $Ca(OH)_2$ to the aqueous solution of the $MgSO_4$ of the filtrate thereby to convert, by double decomposition reaction, at least the greater part of the $MgSO_4$ into $Mg(OH)_2$ and, at the same time, the $Ca(OH)_2$ into gypsum, the resulting aqueous slurry containing the $Mg(OH)_2$ thus formed as well as the gypsum being used for the above mentioned scrubbing of the waste gas. The double decomposition reaction in this process is carried out in the presence of seed crystals of gypsum to obtain gypsum of good quality.

10 Claims, 6 Drawing Figures

PROCESS FOR REMOVAL OF SULFUR OXIDES FROM WASTE GASES

BACKGROUND OF THE INVENTION

This invention relates to processes for removal of sulfur oxides (SOx) in waste gases with the use of magnesium hydroxide as a principal absorbent. More specifically, the invention relates to a process of this character wherein desulfurization is carried out with magnesium hydroxide as an absorbent, and the SOx thus absorbed is recovered as gypsum of good quality.

The process of causing an aqueous slurry for absorbing of a calcium compound such as calcium hydroxide or calcium carbonate to contact a waste gas containing SOx in an absorption tower thereby to fix the SOx as calcium sulfite and thereby to carry out desulfurization is known. If this calcium sulfite is oxidized, gypsum will be obtained.

Since this process is accompanied by a number of problems, we have previously proposed an improved process as disclosed in the specification of Japanese Patent Application No. 30279/1973, Japanese Patent Publication No. 11680/1977, wherein magnesium hydroxide is jointly used as an absorbent in a specific proportion. This magnesium hydroxide also reacts with the SOx to become magnesium sulfite, which is oxidized at the same time as the oxidation of the calcium sulfite to become magnesium sulfate. This calcium sulfate is caused to react with the magnesium hydroxide and becomes magnesium hydroxide by a double decomposition as indicated by the equation set forth below, and, at the same time, gypsum is formed.

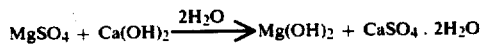

In a preceding invention of ours, the mole ratio of $Ca(OH)_2/Mg(OH)_2$ in the absorbing slurry is limited to 0.5 to 99. The reason for this is as follows.

Since a magnesium compound has a higher SOx absorbing efficiency than a calcium compound, it would appear that a small value of this mole ratio is desirable if only the desulfurization efficiency were to be considered. However, a small value of this mole ratio gives rise to a large quantity of the $Ca(OH)_2$ consumed in the reaction indicated by the above reaction equation of the supplemented $Ca(OH)_2$ and, consequently, results in the formation of a large quantity of $CaSO_4$ in the $Mg(OH)_2$ regeneration reactor. However, by a reaction according to the reaction equation (1), only a coarse or crude gypsum in muddy state can be obtained. As a consequence, the quantity of the crude gypsum in muddy state formed in the $Mg(OH)_2$ regeneration reactor becomes considerably more than the quantity of gypsum formed in the subsequent oxidation step, and this results in a lowering of the quality of the recovered gypsum.

In order to solve this problem arising from the contradictory nature of improvement of absorptivity of the absorption liquor and impairment of quality of the gypsum produced, we have previously invented a waste gas desulfurization method wherein, by limiting the mole ratio of $Ca(OH)_2/Mg(OH)_2$ in the absorption liquor supplied to the absorption tower to 0.5 to 99, the absorption efficiency of magnesium compounds is sustained, whereby gypsum of good quality is obtained, as disclosed in the Japanese Patent Publication hereinbefore.

As mentioned hereinbefore, however, a magnesium compound such as $Mg(OH)_2$ has a higher SOx absorption efficiency than a calcium compound such as $Ca(OH)_2$. Accordingly, it would be highly profitable if, by using a greater quantity of $Mg(OH)_2$ than $Ca(OH)_2$, preferably by using substantially only $Mg(OH)_2$, for the absorbent, a gypsum of good quality could be obtained.

SUMMARY OF THE INVENTION

It is an object of this invention to provide a solution for the above stated problem.

Another object of this invention is to realize improvement of desulfurization efficiency and production of gypsum of good quality by using magnesium hydroxide containing substantially no calcium hydroxide for the SOx absorbent.

The process for removal of sulfur oxides from waste gases containing the sulfur oxides in accordance with the present invention, in the broadest aspect thereof, comprises the steps in combination of:

A. contacting an aqueous slurry containing magnesium hydroxide as well as gypsum with a waste gas containing sulfur oxides thereby to fix the sulfur oxides as magnesium sulfite;

B. contacting the aqueous slurry containing the magnesium sulfite as well as the gypsum with an oxidizing agent thereby to convert the magnesium sulfite into magnesium sulfate;

C. subjecting the aqueous slurry containing magnesium sulfate as well as gypsum to filtration, thereby to obtain an aqueous solution of the magnesium sulfate and a cake of the gypsum;

D. causing the magnesium sulfate in the aqueous solution to undergo double decomposition with calcium hydroxide in the presence of a quantity of gypsum crystals as seed crystals thereby to obtain a slurry of magnesium hydroxide and gypsum, which slurry is to be recycled to the step A.

In accordance with this invention, a magnesium compound such as magnesium hydroxide is used in a great quantity relative to that of a calcium compound such as calcium hydroxide thereby to improve the absorption efficiency of the absorbing slurry. For this purpose, the mole ratio of Mg compound to the Ca compound to be supplied to the $Mg(OH)_2$ regeneration reactor, that is, the mole ratio of the double decomposition components, is caused to be $MgSO_4/Ca(OH)_2 \geq 1$, and we have carried out studies for extending the invention to a process wherein, for the constituent of the absorbent of the absorption liquor, it is possible even to use substantially only $Mg(OH)_2$ without any $Ca(OH)_2$. It this we have finally succeeded.

In accordance with this invention, by adding crystalline gypsum as seed crystals in the $Mg(OH)_2$ regeneration reaction step wherein $MgSO_4$ is caused to undergo double decomposition by adding $Ca(OH)_2$, the absorptivity of the Mg compound is caused to be amply exhibited, and, at the same time, gypsum of good quality is obtained, without limiting the mole ratio $Ca(OH)_2/Mg(OH)_2$ in the absorption liquor supplied to the absorption tower. This process of the invention is particularly effective in the case where the mole ratio $MgSO_4/Ca(OH)_2$ in the double decomposition in the Mg regeneration reaction step is equal to or greater than 1 (unity), that is, where the $Ca(OH)_2$ in the absorption liquor supplied to the absorption tower is of zero quantity.

The nature, utility, and further features of this invention will be apparent from the following detailed description beginning with a consideration of general aspects of the invention and concluding with a specific example of practice including a number of test runs.

ILLUSTRATIONS

In the illustrations

FIG. 1 is a flow sheet showing one example of practice of the process according to this invention; and FIGS. 2 through 6 are photomicrographs (magnification 150×) respectively of gypsum produced in the test runs in the example.

DETAILED DESCRIPTION

Figure 1:
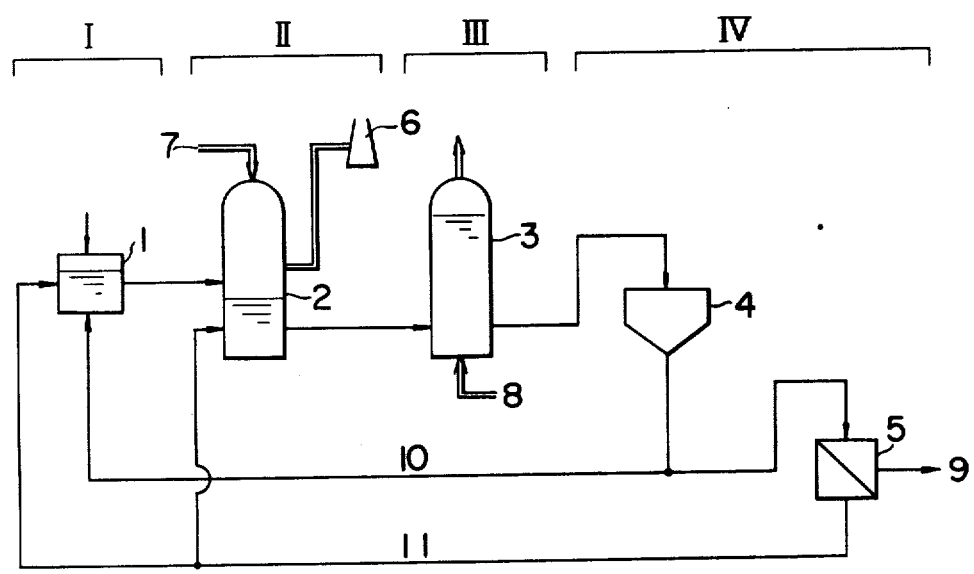
Figure 2:
Figure 3:
Figure 4:
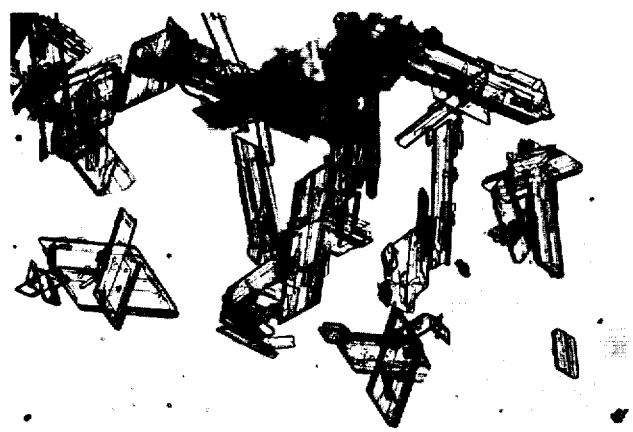
Figure 5:

The invention will first be described with respect to one example of practice thereof as indicated in the flow sheet of FIG. 1. This process comprises an Mg(OH)$_2$ regeneration step I, a waste gas absorption step II, an MgSO$_3$ oxidation step III, and a gypsum separation step IV. In the process step I, the double decomposition of the MgSO$_4$ formed in the step III and Ca(OH)$_2$ is carried out, and the gas absorption of the step II is carried out with the slurry formed in this step I containing the Mg(OH)$_2$ and the gypsum. On one hand, the gypsum formed in the step I and passing through the steps II and III is separated in the step IV.

Mg(OH)$_2$ Regeneration step I

In this Mg(OH)$_2$ regeneration reaction step I, the filtrate containing MgSO$_4$ from which gypsum has been removed by separation in the gypsum separation step IV is supplied into a regeneration reactor 1, into which Ca(OH)$_2$ is added, and Mg(OH)$_2$ is regenerated by the double decomposition reaction indicated in the reaction equation given hereinbefore. In this case, an Mg(OH)$_2$ slurry containing gypsum of good quality is formed by the addition of gypsum seed crystals in accordance with this invention. This slurry and the absorption liquor are supplied to an absorption tower 2.

As mentioned hereinbefore, a greater proportion of Mg(OH)$_2$ in the mole ratio Ca(OH)$_2$/Mg(OH)$_2$ in the absorption slurry supplied to the absorption tower 2 results in a higher absorptivity, and in particular an absorption liquor produced from the regeneration of the Mg(OH)$_2$ by carrying out the double decomposition in the case of only Mg(OH)$_2$ without the presence of Ca(OH)$_2$ as the absorbent in the absorption liquor, that is, in the range of a double decomposition constituent mole ratio MgSO$_4$/Ca(OH)$_2$ equal to or greater than 1 (unity), is very suitable; and the quantity of MgSO$_4$ supplied into the Mg(OH)$_2$ regeneration reactor 1 is regulated so as to maintain the double decomposition mole ratio within this range.

It is preferable that the concentration of the aqueous magnesium supplied to the double decomposition reaction, that is, that in the slurry containing gypsum after the oxidation step or in the aqueous solution after the separation of gypsum be of the order of 2 to 10 percent. On one hand, the quantity of the Ca(OH)$_2$ supplied is ordinarily substantially the same as that of the SOx to be absorbed.

The calcium hydroxide, which is one of the reactants in the double decomposition, may be introduced as calcium hydroxide into the double decomposition reactor, or it may be introduced thereinto in the form of calcium oxide and caused in situ to form calcium hydroxide. In the case where it is introduced in the form of calcium hydroxide, it can be introduced in the form of a slaked product of calcium oxide. The slaking water in this case may be pure water or it may be the slurry obtained from the double decomposition reactor.

The Ca(OH)$_2$ to be fed to the Mg(OH)$_2$ regeneration reactor may be in a dry particulate form or in a slurry form, and when it is in a slurry form the concentration of the slurry is preferably of the order of 10 to 60%, preferably of the order of 20 to 40%, from a viewpoint of industrial or commercial operation.

One other requisite condition according to this invention in carrying out the double decomposition reaction is that it be carried out in the presence of gypsum seed crystals. In the Mg(OH)$_2$ regeneration reactor 1, Mg(OH)$_2$ and CaSO$_4$.2H$_2$O are regenerated by the addition of Ca(OH)$_2$ according to Eq.(1) set forth hereinbefore. In this case, the addition of the seed crystals causes the CaSO$_4$.2H$_2$O to be formed, not in a muddy state, but as crystals of excellent quality and of large crystal form.

Principal examples of possible sources of seed crystals of gypsum, in addition to a portion of the gypsum separated in a separator 5 are the gypsum in slurry form withdrawn out of the bottom of a thickener 4, the slurry taken out of an oxidizing tower or reactor 3, and slurry taken out of the absorption tower or reactor 2. That is, any gypsum formed in the process may be used for this purpose, or crystalline gypsum separately prepared may be added.

There is an optimum value of the quantity of the crystalline gypsum added as seed crystals, desirably being 30 to 150 percent by weight, preferably 80 to 120 percent by weight, of the quantity of gypsum formed in the double decomposition step.

While there is no particular limit to the temperature of the Mg(OH)$_2$ regeneration reaction step, we have verified, as a result of various tests, that a high temperature results in the formation of gypsum of good quality of plate form and large size. Accordingly, the temperature range which can be used in the practice of this invention is, in general, from room temperature to 85° C. and, preferably, from 40° to 80° C. The pressure under which this step is carried out may be atmospheric pressure or a higher pressure. There is no particular necessity of limiting the pH.

Absorption step

An absorption liquor comprising a slurry containing gypsum and Mg(OH)$_2$ from the above described Mg(OH)$_2$ regeneration step is accommodated in the absorption tower or reactor 2. Into this absorption tower 2, the waste gas 7 is introduced from a suitable point such as, for example, the top of the tower thereby to cause absorption of SOx and formation of MgSO$_3$. This absorption operation can be carried out by any process which can be applied to scrubbing of a gaseous component by a liquid or, more specifically, by an aqueous slurry. Furthermore, the absorption liquor contains Mg(OH)$_2$ as well as gypsum and may contain a small quantity of another SOx absorbent provided that this Mg(OH)$_2$ functions as a substantial absorbent. Examples of such other absorbents are magnesium carbonate, dolomite, and other magnesium compounds which are added in some cases to make up the consumed Mg(OH)$_2$ (the case wherein the consumption of Mg(OH)$_2$ is compensated for by adding Mg(OH)$_2$ being, of course, within the purview of this invention), or calcium hydroxide, calcium carbonate, and other calcium compounds which may, if desired, be used. The absorption pressure and temperature are ordinarily of the order of −300 to +300 mm H₂O, gage and of the order of 40° to 60° C., respectively.

Oxidation step

The slurry containing magnesium sulfite formed in this manner is oxidized in the absorption tower 2 by the oxygen in the waste gas or is sent to the oxidation tower or reactor 3 and is there oxidized into $MgSO_4$ by a suitable oxidizing agent, preferably molecular oxygen, e.g., air or oxygen gas introduced as at 8. This oxidation can be carried out by any process in which ample contact between the slurry and the oxidizing agent used in assured, but, ordinarily, it is carried out by blowing into the slurry a gaseous oxidizing agent, e.g., molecular oxygen, under the conditions of a pressure of the order of 0.3 to 3.0 kg./cm²., gage, and a temperature of the order of 50° to 80° C.

Separation step

Because of its high solubility, the $MgSO_4$ is in the liquid phase, whereas, the gypsum is mostly in the solid phase because of its low solubility. Accordingly, the slurry after the above described oxidation step is subjected to a suitable solid-liquid separation or is supplied to a filtering device such as, for example, a thickener 4, thereby to concentrate the gypsum by sedimentation. The gypsum is further collected by the separator 5, and the solution portion containing $MgSO_4$ is recirculated through pipe lines 10 and/or 11 to the regeneration reactor 1. One portion of the gypsum separated by the separator 5 may be added as seed crystals to the $Mg(OH)_2$ regeneration reactor 1.

The objective waste gases to be processed in accordance with this invention can be of various kinds containing, such as $SO_2$ and/or $SO_3$, particularly, $SO_2$. Specific examples are exhaust gases produced by the combustion of sulfur-containing fuels such as, for example, petroleum and coal.

In the practice of this invention in the case of removal of SOx as gypsum, it is possible to cause the quantity of $Ca(OH)_2$ in the absorption liquor to be substantially zero and only $Mg(OH)_2$ to be the absorbent of the SOx, whereby a great increase in the rate of desulfurization of the waste gas is attained, and, at the same time, gypsum of excellent quality is produced. An attendant advantageous feature of the process of this invention is that almost the entire quantity of the gypsum formed in the absorption tower is discharged therefrom, whereby scaling trouble in the absorption tower is eliminated.

In order to indicate more fully the nature and utility of this invention, the following example is set forth, it being understood that this example is presented as illustrative only and that it is not intended to limit the scope of the invention.

EXAMPLE

The results of tests in a continuous reaction vessel operated on a bench scale are set forth in Table 1. The controlled parameters were as follows.

(1). Percentage of seed crystals fed—

$$\frac{\text{(quantity of gypsum crystals fed)}}{\text{(quantity of gypsum formed in double decomposition)}} \times 100 \quad (wt/wt)$$

(2). Reaction temperature (3). Mole ratio of double decomposition reactants, $MgSO_4/Ca(OH)_2$ The concentration of the $MgSO_4$ in the mother liquor (i.e., the filtrate after separation of gypsum after oxidation) introduced into the Mg regeneration reactor was adjusted to 5 percent.

Each test was carried out by adding a specific quantity of the gypsum seed crystals beforehand in the mother liquor. The $Ca(OH)_2$ added into the Mg regeneration reactor was added in the form of a slurry of 7 percent of $Ca(OH)_2$ thus adjusted beforehand with pure water.

Table 1

| Test run No. | Reaction conditions of test runs | | |
|---|---|---|---|
| | Seed crystal feeding rate | Reaction temperature | Double decomposition mol ratio |
| 1 | 87 (%) | 58 (°C.) | 1.25 |
| 2 | 0 | 58 | 1.25 |
| 3 | 87 | 68 | 1.25 |
| 4 | 87 | 77 | 1.25 |
| 5 | 0 | 77 | 1.25 |
| 6 | 87 | 77 | 0.67 |

In the series of test runs, with the exception of test run No. 6 wherein $Ca(OH)_2$ remained after the reaction because the double decomposition mole ratio was less than 1 (unity), the $Mg(OH)_2$ in the sampled slurry liquor was neutralized with 98-percent $H_2SO_4$ and dissolved while the sample slurry was agitated with a stirrer. Thereafter, this slurry was suction-filtered, and the solid content $CaSO_4.2H_2O$ was dried at approximately 40° C., after which measurement of particle size was carried out. The distributions of particle size of the gypsum seed crystals and the gypsum obtained by the test runs are set forth in Table 2. The measurement of these particle size distributions was carried out by sieving for sizes above 44 microns and by the optical scanning method for sizes below 44 microns.

Table 2

| Particle Size (microns) | Particle size distributions | | | | | | Seed crystal gypsum |
|---|---|---|---|---|---|---|---|
| | Test Run No. | | | | | | |
| | 1 | 2 | 3 | 4 | 5 | 6 | |
| 0–8 | 0.5 | 1.8 | 0.1 | 0.2 | 0.9 | 0.6 | 1.2 |
| 8–16 | 8.5 | 10.6 | 3.5 | 2.4 | 9.6 | 7.9 | 14.4 |
| 16–24 | 10.7 | 12.2 | 8.8 | 5.4 | 7.1 | 6.6 | 13.3 |
| 24–32 | 14.2 | 5.4 | 11.5 | 8.4 | 4.5 | 6.7 | 11.1 |
| 32–44 | 11.8 | 4.5 | 15.2 | 9.9 | 3.8 | 6.3 | 6.1 |
| 44–53 | 17.5 | 13.8 | 17.2 | 19.5 | 11.2 | 14.6 | 24.8 |
| 53–74 | 17.4 | 21.8 | 22.4 | 25.9 | 15.5 | 14.3 | 14.6 |
| 74–105 | 12.5 | 14.0 | 13.9 | 17.4 | 18.6 | 8.0 | 7.7 |
| 105–210 | 5.1 | 14.6 | 6.1 | 9.1 | 22.4 | 9.7 | 5.0 |
| 210–297 | 1.4 | 0.9 | 0.9 | 1.3 | 5.8 | 4.3 | 0.9 |
| 297–350 | 0.4 | 0.5 | 0.4 | 0.5 | 0.6 | 2.8 | 0.2 |
| more than 350 | nil | nil | nil | nil | nil | 18.2 | 0.7 |

Analysis of test results (1) Effect of seed crystal feeding rate

When the distributions of particle size of the gypsum formed with the mole ratio of the double decomposition reactants and the reaction temperature controlled at constant values in the case where seed crystals were added and in the case where they were not added, that is, in the cases of test runs No. 1 and No. 2 and test runs No. 4 and No. 5, are examined from photomicrographs (FIGS. 2-5), it is clearly observed that the particles in the case where seed crystals were added had grown to greater sizes than those in the case where the seed crystals were not added. Furthermore, in the case where the seed crystals were added, the number of fine particles of gypsum was overwhelmingly small.

(2) Effect of the reaction temperature

The effect of the reaction temperature on the gypsum particle size, under the condition of constant rate of feed of seed crystals and constant mole ratio of double decomposition reactants, can be compiled as set forth in Table 3.

Table 3

| Test run No. | Reaction temp. | % by weight of particles of less than 20μ | Particle size of particles comprising 50% by weight |
|---|---|---|---|
| Seed crystals | — | 24% | 41 μ |
| 1 | 58° C. | 16% | 46 μ |
| 3 | 68° C. | 8% | 50 μ |
| 4 | 77° C. | 5% | 58 μ |

It is apparent from these results that the higher the reaction temperature, the greater is the growth of the crystals and the greater is the particle size.

(3) Effect of the double decomposition mole ratio

Figure 6:

When the test run Nos. 4 and 6 in which the double decomposition mole ratios are respectively 1.25 and 0.67 with the same seed crystal feeding rate and the same reaction temperature are compared by examining their respective photomicrographs, it is observed that test run No. 6 (FIG. 6) exhibits a greater number of crystals of small particle size.

In the case where the double decomposition mole ratio was less than 1.0, $Ca(OH)_2$ remained, whereby test run Nos. 6 and 4 could not be compared with respect to particle size distribution by sieving or by the optical scanning method.

We claim:

1. A process for removal of sulfur oxides from waste gases, which comprises the steps, in combination, of:
   A. contacting an aqueous slurry containing magnesium hydroxide as well as gypsum with a waste gas containing sulfur oxides thereby fixing the sulfur oxides as magnesium sulfite;
   B. contacting the aqueous slurry containing the magnesium sulfite as well as the gypsum with an oxidizing agent thereby converting the magnesium sulfite into magnesium sulfate;
   C. subjecting the aqueous slurry containing magnesium sulfate as well as gypsum to filtration thereby obtaining an aqueous solution of the magnesium sulfate and a cake of gypsum;
   D. causing the magnesium sulfate in the aqueous solution to undergo double decomposition with calcium hydroxide with the addition of a quantity of gypsum crystals as seed crystals thereby obtaining a slurry of magnesium hydroxide and gypsum, which slurry is to be recycled to step A;

wherein the mole ratio of $MgSO_4/Ca(OH)_2$ in step D is controlled so as to be equal to or higher than 1.0 whereby the resulting slurry is substantially free of calcium hydroxide when it is recycled to step A.

2. The process as claimed in claim 1 in which the calcium hydroxide in the step D is added to the step in the form of calcium oxide.

3. The process as claimed in claim 1 in which the calcium hydroxide in the step D is added to the step in the form of calcium hydroxide.

4. The process as claimed in claim 1 in which the calcium hydroxide to be added is a slaked product of calcium oxide with the slurry of the step D in the calcium hydroxide concentration of 10 to 60% by weight.

5. The process as claimed in claim 1 in which the quantity of gypsum as seed crystals in the step D is from 30 to 150% by weight of the quantity of gypsum to be produced in the step D.

6. The process as claimed in claim 1 in which the gypsum as seed crystals is obtained from any step of the steps A and B.

7. The process as claimed in claim 1 in which the temperature at which the double decomposition reaction in the step D is effected is from 40° to 80° C.

8. The process as claimed in claim 1 in which the concentration of the magnesium sulfate in its solution at the double decomposition reaction in the step D is from 2 to 10% by weight.

9. The process as claimed in claim 1 in which the oxidizing agent in the step B is molecular oxygen.

10. The process as claimed in claim 9 in which the molecular oxygen is air and the oxidation is effected at a temperature of from 50° C. to 80° C.

* * * * *